United States Patent
Kraewer et al.

(10) Patent No.: US 12,241,393 B2
(45) Date of Patent: Mar. 4, 2025

(54) METHOD FOR DETERMINING A FUNCTIONALITY OF AN EXHAUST GAS SENSOR IN AN EXHAUST GAS SYSTEM OF AN INTERNAL COMBUSTION ENGINE

(71) Applicant: Robert Bosch GmbH, Stuttgart (DE)

(72) Inventors: Bernd Kraewer, Winnenden (DE); Julian Tobias Zauner, Kornwestheim (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 18/078,297

(22) Filed: Dec. 9, 2022

(65) Prior Publication Data

US 2023/0184154 A1 Jun. 15, 2023

(30) Foreign Application Priority Data

Dec. 13, 2021 (DE) .......................... 102021214192.7

(51) Int. Cl.
*F01N 11/00* (2006.01)
*F01N 13/00* (2010.01)

(52) U.S. Cl.
CPC ............ *F01N 11/00* (2013.01); *F01N 13/008* (2013.01); *F01N 2550/00* (2013.01); *F01N 2900/0416* (2013.01); *F01N 2900/1602* (2013.01)

(58) Field of Classification Search
CPC .... F01N 11/00; F01N 13/008; F01N 2550/00; F01N 2900/0416; F01N 2900/1602; F01N 3/101; F01N 11/002; F01N 2560/025; F01N 2560/026; F01N 2560/14; F01N 2560/20; F01N 9/00; F01N 11/007; Y02T 10/40

See application file for complete search history.

(56) References Cited

U.S. PATENT DOCUMENTS

| | | | |
|---|---|---|---|
| 5,331,808 A | 7/1994 | Koike | |
| 2004/0000135 A1* | 1/2004 | Uchida | ............... F02D 41/1495 60/285 |
| 2004/0103647 A1* | 6/2004 | Yomogida | ............... F02D 41/40 60/284 |
| 2009/0313974 A1* | 12/2009 | Iida | ....................... F01N 11/007 60/287 |

(Continued)

FOREIGN PATENT DOCUMENTS

| | | |
|---|---|---|
| DE | 69921895 T2 | 12/2005 |
| DE | 102004051747 A1 | 4/2006 |
| DE | 102013209487 A1 | 11/2014 |

*Primary Examiner* — Brandon D Lee
(74) *Attorney, Agent, or Firm* — Michael Best & Friedrich LLP

(57) ABSTRACT

Determining a functionality of an exhaust gas sensor in an exhaust gas system having a catalytic converter and a first exhaust gas sensor upstream of the catalytic converter and a second exhaust gas sensor downstream of the catalytic converter. The first and the second exhaust gas sensors are heated to a temperature above a minimum operating temperature. A first sensor signal of the first exhaust gas sensor; and a second sensor signal of the second exhaust gas sensor are determined. The first and the second sensor signals are compared in an operating period in which a temperature of the at least one catalytic converter does not exceed a temperature threshold value; and an operating parameter of the first exhaust gas sensor (121) is determined on the basis the comparison.

15 Claims, 2 Drawing Sheets

(56) References Cited

U.S. PATENT DOCUMENTS

| | | | |
|---|---|---|---|
| 2012/0085084 A1* | 4/2012 | Bisaiji | F01N 11/007 60/276 |
| 2014/0005882 A1* | 1/2014 | Aoki | F02D 41/1438 701/33.1 |
| 2020/0141892 A1* | 5/2020 | Aoki | G01N 27/4175 |

* cited by examiner

METHOD FOR DETERMINING A FUNCTIONALITY OF AN EXHAUST GAS SENSOR IN AN EXHAUST GAS SYSTEM OF AN INTERNAL COMBUSTION ENGINE

BACKGROUND OF THE INVENTION

The present invention relates to a method for determining a functionality of an exhaust gas sensor in an exhaust gas system of an internal combustion engine, and to a computing unit and a computer program for carrying out said method.

In order to meet the requirements of exhaust gas legislation in various markets, catalytic converters and sensors, in particular exhaust gas sensors such as lambda probes, are generally installed in exhaust gas systems of vehicles with an internal combustion engine. Since these components are mandatory for compliance with the limits, they are usually monitored by various di-agnostics.

In particular in systems with gasoline engines, a stoichiometric air/fuel ratio (lambda value=1) is preferably targeted. This means that there is exactly as much oxygen in the combustion chamber of the engine as is needed to completely burn the fuel into carbon dioxide and water. There are also operating strategies for other engine designs that make operation with an exhaust gas lambda value of 1 necessary (e.g. regeneration of particle filters, heating strategies, etc.).

The advantage of operating the internal combustion engine with an exhaust gas lambda value of 1 is that the exhaust gas emissions behind a three-way catalyst (TWC) are at a minimum at this air/fuel ratio. For this reason, the lambda value of the combustion is preferably regulated to lambda=1.

In order to enable rapid regulation of the lambda value in front of the catalytic converter, at least one lambda probe can be used in front of the three-way catalytic converter. However, this first control loop cannot also take into account the oxygen storage capacity of the catalytic converter. For this reason, at least one further lambda probe can preferably be used behind the catalytic converter in order to ensure that the lambda value of the exhaust gas is also in the emission-optimal range behind the catalytic converter.

Since the probe is "protected" behind the catalytic converter and is thus not exposed to such high exhaust gas temperatures or temperature and pressure fluctuations as a probe between the outlet valve of the engine and the catalytic converter, it is generally assumed that this probe is less susceptible to the effects of aging and sensing errors. For this reason, a probe behind the catalytic converter can be used as a so-called guide probe in the system.

The effects of aging in the combustion system (e.g. deposits on injection nozzles) or on the probe in front of the catalytic converter, uneven distribution or irregularities in the exhaust gas mass flow, leaks in the exhaust gas system, etc., can lead to permanently different measured lambda values on the individual lambda probes. These measurement deviations between a probe in front of the catalytic converter and a probe behind the catalytic converter are referred to as fuel trims or lambda offset. They are generally integrated and corrected with the aim of optimal lambda regulation in the system. If the deviation exceeds a defined threshold, an error in the system is reported and the malfunction indicator light (MIL) is activated.

SUMMARY OF THE INVENTION

The invention relates to a method for determining a functionality of an exhaust gas sensor in an exhaust gas system of an internal combustion engine and to a computing unit and a computer program for carrying out said method.

The invention is based on comparing the signals of two exhaust gas sensors in a state in which the catalytic converter is cold. This takes advantage of the fact that a storage capacity of the catalytic converter for exhaust gas components is (still) very low in such a state and the exhaust gas composition is therefore not significantly influenced by the catalytic converter. While, when the signal deviation between an exhaust gas sensor in front of the catalytic converter and an exhaust gas sensor behind the catalytic converter is determined after light-off of the catalytic converter, the nonlinear behavior of the oxygen storage capacity has to be taken into account, which is complex, before light-off only the gas transit time of the exhaust gas needs to be taken into account as a deviation.

Specifically, the method for determining a functionality of an exhaust gas sensor in an exhaust gas system of an internal combustion engine having at least one catalytic converter and at least one first exhaust gas sensor upstream of the at least one catalytic converter and at least one second exhaust gas sensor downstream of the at least one catalytic converter comprises: heating the first and the second exhaust gas sensor to a temperature above a minimum operating temperature of the relevant exhaust gas sensor; determining a first sensor signal of the first exhaust gas sensor; determining a second sensor signal of the second exhaust gas sensor; comparing the first and the second sensor signal in an operating period in which a temperature of the at least one catalytic converter does not exceed a temperature threshold value; and determining an operating parameter of the first exhaust gas sensor on the basis of a result of the comparison of the first and the second sensor signal. Using this method, a very fast and robust detection of a measurement deviation is possible. Other functionalities that can be released only after the fault-free state has been determined can be released earlier than before. In the case of large measurement deviations, a corresponding error record can be made very quickly, if necessary. The operational frequency of the diagnoses is thereby improved. The invention is also suitable for a plurality of exhaust gas sensors upstream and/or a plurality of exhaust gas sensors downstream of the at least one catalytic converter.

When comparing the first and the second sensor signal, a gas transit time in the exhaust gas system between a position of the first exhaust gas sensor and a position of the second exhaust gas sensor is preferably taken into account. In this way, substantially the same exhaust gas segment is analyzed at both sensor positions, as a result of which deviations between the sensor signals are primarily based on different measurement qualities.

According to a preferred embodiment, the comparison of the first and the second sensor signal in an operating period comprises determining a difference between the first and the second sensor signal and adding or integrating the difference over time. In this way, an obvious deviation can be reliably detected, with short fluctuations or noise having less bearing.

In particular, the temperature threshold value is selected such that a storage capacity of the at least one catalytic converter for exhaust gas components, in particular oxygen, is at most 20%, in particular at most 10%, and preferably at most 5%, of a nominal storage capacity of the at least one catalytic converter. This largely prevents the exhaust gas composition being influenced downstream of the at least one catalytic converter, which increases the comparability of the sensor signals or facilitates the comparison.

The temperature threshold value is selected in particular from a range of 0° C. to 250° C., in particular 10° C. to 200° C., preferably 20° C. to 100° C., wherein upper and lower limits can be combined as desired. These are temperature ranges in which the catalytic converter is not yet ready for operation, in particular not capable of conversion, and does not have any significant storage capacity for exhaust gas components.

Preferably, the first and/or the second exhaust gas sensor comprises a broadband lambda sensor and/or a switching-type lambda sensor and/or an $NO_x$ sensor and/or an oxygen sensor. These are particularly relevant sensors for controlling exhaust gas systems.

A measure, in particular output of a warning message and/or determination of a correction value, is preferably carried out on the basis of the operating parameter. In this way, it is possible to take into account a deviation which has been determined, but is still acceptable, between the first and the second sensor signal in order to make the control of the exhaust gas system more precise, for example by adapting an evaluation of the sensor signals. A deviation that is no longer acceptable can be used to establish a malfunction and for corresponding notification of a user in order to request maintenance or replacement of the exhaust gas sensor if necessary.

In this case, a determined correction value, which can be determined, for example, in the form of a correction factor or an additive lambda offset, can be used for the future evaluation of the first sensor signal and, for this purpose, can be offset against the first sensor signal. For example, if a lambda offset has been determined, the first sensor signal can be added to the lambda offset in order to obtain a corrected sensor signal. Thus, a detected sensing defect can be corrected, which positively influences the regulation quality of the lambda regulation.

A computing unit according to the invention, e.g. a control unit of a motor vehicle, is configured, in particular programmatically, to carry out a method according to the invention.

Furthermore, the implementation of a method according to the invention in the form of a computer program or computer program product with program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, DVDs, and others. It is also possible to download a program via computer networks (Internet, Intranet, etc.). Such a download can be wired or wireless (e.g. via a WLAN network or a 3G, 4G, 5G or 6G connection, etc.).

Further advantages and embodiments of the invention can be found in the description and the accompanying drawings.

The invention is illustrated schematically in the drawings on the basis of an embodiment and is described below with reference to the drawings.

DETAILED DESCRIPTION

Figure 1:
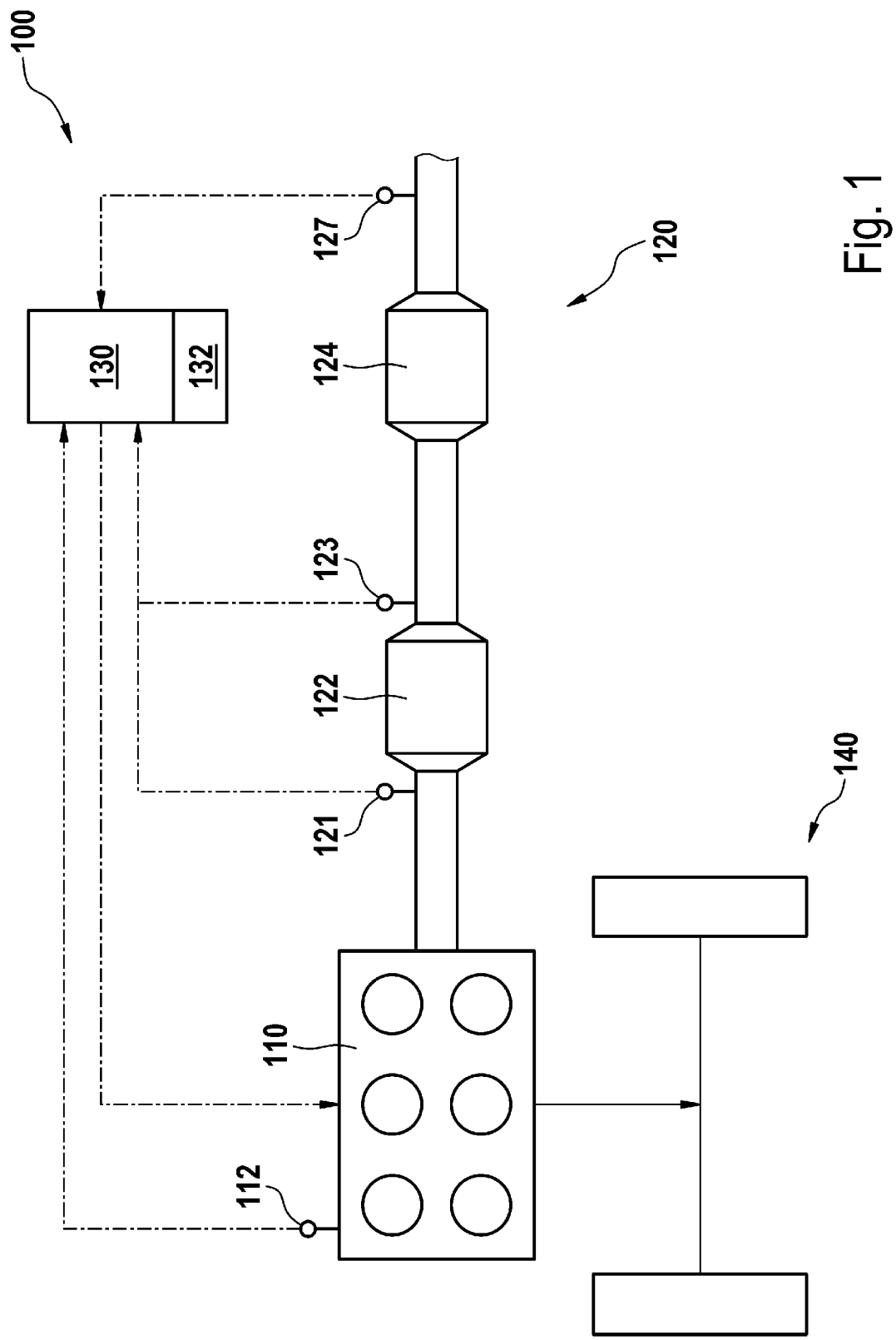
FIG. 1 schematically shows a vehicle having an internal combustion engine and a catalytic converter as can be used within the scope of the present invention.

In FIG. 1, a vehicle as can be used within the framework of the invention is shown schematically and designated overall with the number 100. The vehicle 100 comprises an internal combustion engine 110, here for example having six indicated cylinders, an exhaust gas system 120 which has a first catalytic converter 122 and a second catalytic converter 124, and a computing unit 130 which is configured to control the internal combustion engine 110 and the exhaust gas system 120 and is connected to said system in a data-conducting manner. Furthermore, in the example shown, the computing unit 130 is connected to sensors 121, 123, 127 in a data-conducting manner, which sensors detect operating parameters of the internal combustion engine 110 and/or of the exhaust gas system 120. In the example shown, for example, a broadband lambda sensor 121 can be provided upstream and a switching-type lambda sensor 123 downstream of a three-way catalyst 122. It should be understood that further sensors which are not shown may be present. The exhaust gas system 120 may optionally also have further cleaning components, such as, for example, particle filters and/or further catalytic converters, which, however, are not shown here for the sake of simplicity.

For the sake of simplicity, only one individual three-way catalyst (TWC) 122 is considered below. However, the invention can also be applied analogously to further catalytic converters and/or other types of catalytic converter in the exhaust gas system 120 if a lambda probe or another exhaust gas sensor which in particular provides a lambda signal is present in front of and behind the relevant catalytic converter. The invention can in principle be used with any internal combustion engine which is operated stoichiometrically (for example gasoline, alcohol, gas, or hydrogen if applicable), in which in particular the use of a catalytic converter with oxygen storage capacity is appropriate. However, the invention is not limited to exhaust gas systems in which catalytic converters with oxygen storage capacity are installed.

In the example shown here, the computing unit 130 comprises a data memory 132 in which, for example, computation rules and/or parameters (e.g. threshold values, characteristic variables of the internal combustion engine 110 and/or the exhaust gas system 120, or the like) can be stored.

The internal combustion engine 110 drives wheels 140 and can also be driven by the wheels in certain operating phases (e.g. so-called overrun mode).

Figure 2:
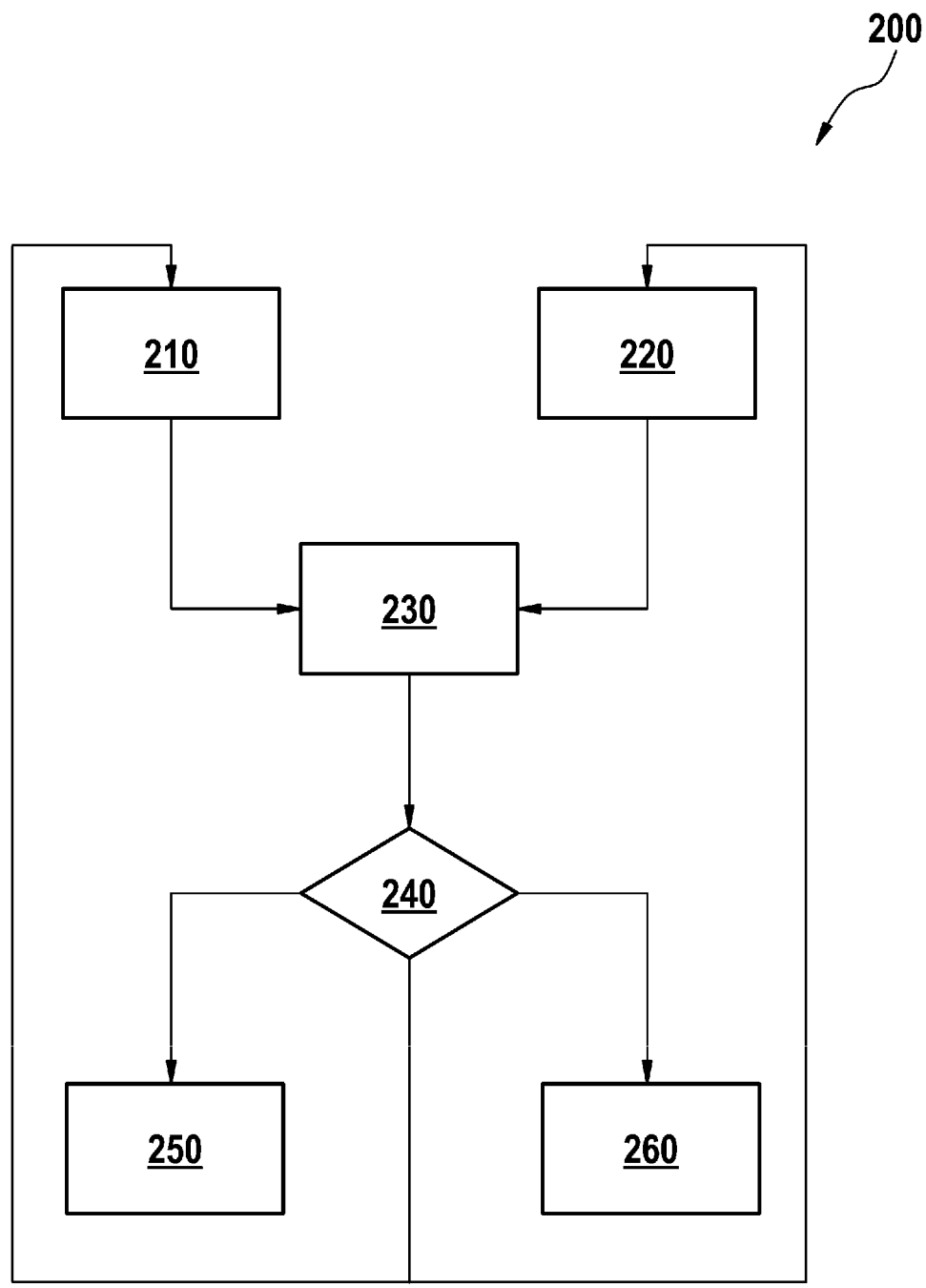
FIG. 2 shows an advantageous embodiment of the invention in the form of a greatly simplified flow chart.

In FIG. 2, an advantageous embodiment of a method according to the invention is shown schematically in the form of a flow chart and denoted overall by the number 200.

References to components of a vehicle or to a part of a vehicle used in the description of the method 200 relate in particular to the vehicle 100 shown in FIG. 1.

The method 200 is shown step-by-step below in order to enable a better understanding of the invention. However, this should not be understood to mean that the invention is limited to a step-by-step implementation of the method 200. Rather, individual steps can also be carried out simultaneously or in another order, for example in reverse order, unless expressly stated otherwise. A substantially continuous execution of some of the steps described may also be advantageous where appropriate.

It should again be emphasized here that the method 200 is carried out in a state of the exhaust gas system 120 in which the catalytic converter 122 has a temperature which does not exceed a temperature threshold value. For example, the temperature threshold value may be 150° C. At a temperature below this temperature threshold value, a storage capacity and a catalysis capacity of the catalytic converter 122 are so low that a composition of the exhaust gas flowing through the catalytic converter 122 is not significantly changed.

In the context of a step 210 of the method 200, a first sensor signal of the lambda probe 121 is detected upstream of the catalytic converter 122. In a step 220, a second sensor signal of the lambda probe 123 is detected downstream of the catalytic converter 122.

In one example, the exhaust gas is regulated to lambda=1 in front of the catalytic converter on the basis of the signal of the first lambda probe 121 (broadband probe). A second control loop with the setpoint value lambda=1 is established on the basis of the second lambda 123 probe behind the catalytic converter. The control deviations of this second control loop are integrated and, for example, interpreted as a measurement deviation between the first lambda probe 121 (in front of the catalytic converter) and the second lambda probe 123 (behind the catalytic converter). In practice, the error thresholds are approximately 3% (fuel trim error) or 6% (offset error of the first sensor). The detected deviations are adapted.

In another example, the detected first and second sensor signal are compared with one another in a step 230. In this case, a gas transit time, which requires the exhaust gas to pass the section of the exhaust gas system 120 located between the position of the lambda probe 121 and the position of the lambda probe 123, is taken into account, so that signals relating to an identical exhaust gas are compared with one another.

The gas transit time can be calculated, for example, from a known distance or a known exhaust gas system volume between the two sensor positions in combination with a measured exhaust gas mass flow or a flow rate determined from a (differential) pressure measurement. For example, a lambda difference can be calculated during the comparison. The lambda difference determined in this way is preferably integrated or added over time, so that, in the event of a longer deviation between the two sensor signals in the same direction, an increasing comparison result is given, while in the case of a deviation with an alternating sign, the comparison result fluctuates around zero.

In a step 240, on the basis of the result of the comparison from step 230, for example on the lambda difference which is added or integrated over time, the rest of the method 200 is determined. For this purpose, the integrated lambda difference can be compared with one or more differential threshold values, for example. If the integrated lambda difference is below a first, low threshold value, which can be $\Delta\lambda=0.03$, for example, the method returns to steps 210 and 220.

However, if the lambda difference is above a second, high threshold value, which can be 0.06, for example, then the method continues with a step 260 in which a malfunction of the lambda probe 121 upstream of the catalytic converter 122 is determined and a corresponding measure, for example output of a warning message, in particular in the form of actuation of a malfunction indicator light, is carried out.

If the lambda difference is between the first and the second threshold value, the method can continue with a step 250 in which a correction value, for example in the form of a correction factor or an additive lambda offset, is determined, which value is stored in the data memory 132 of the computing unit 130 and is used for future evaluation of the first sensor signal. In particular, a cause of a particular deviation can also be determined on the basis of the determined deviation. For example, in the case of a relatively low deviation, a so-called fuel trim error can be assumed, which can be corrected or compensated for by an adjustment of the quantity of fuel supplied to the internal combustion engine, whereas, in particular in the case of higher deviations, the cause may be an offset between the lambda probe 121 and the lambda probe 123, which can be corrected computationally in the signal evaluation.

The specific first and second threshold values can of course be selected so as to be different from the examples given here. If, for example, the first, low threshold value is equal to zero, the determined deviation is always corrected continuously. The upper threshold value can also be omitted entirely, for example.

The invention claimed is:

1. A method (200) for determining a functionality of an exhaust gas sensor (121) in an exhaust gas system (120) of an internal combustion engine (110) having at least one catalytic converter (122) and a first exhaust gas sensor (121) upstream of the at least one catalytic converter (122) and a second exhaust gas sensor (123) downstream of the at least one catalytic converter (122), comprising:

heating the first and the second exhaust gas sensor (121, 123) to a temperature above a minimum operating temperature of the relevant exhaust gas sensor (121, 123), detecting (210) at a computing unit (130) a first sensor signal of the first exhaust gas sensor (121), detecting (220) at the computing unit (130), a second sensor signal of the second exhaust gas sensor (123)

comparing (230) with the computing unit (130) the first and the second sensor signals in an operating period in which a temperature of the at least one catalytic converter (122) does not exceed a temperature threshold value, computing with the computing unit (130) a lambda difference between the first and second sensor signals;

determining (250) with the computing unit (130) a correction value of the first exhaust gas sensor (121) when the lambda difference is between a first threshold value and a second threshold value; and controlling the internal combustion engine according to the correction value.

2. The method (200) according to claim 1, wherein a gas transit time in the exhaust gas system (120) between a position of the first exhaust gas sensor (121) and a position of the second exhaust gas sensor (123) is taken into account in the comparison (230) of the first and the second sensor signal.

3. The method (200) according to claim 1, further comprising adding or integrating the lambda difference over time.

4. The method according to claim 1, wherein the temperature threshold value is selected such that a storage capacity of the at least one catalytic converter (122) for exhaust gas components is at most 20% of a nominal storage capacity of the at least one catalytic converter (122).

5. The method (200) according to claim 1, wherein the temperature threshold value is selected from a range of from 0 C to 250 C.

6. The method (200) according to claim 1,
wherein the first exhaust gas sensor (121) comprises a broadband lambda sensor and/or a switching-type lambda sensor and/or an NOx sensor and/or an oxygen sensor, and/or
wherein the second exhaust gas sensor (123) comprises a broadband lambda sensor and/or a switching-type lambda sensor and/or an NOx sensor and/or an oxygen sensor.

7. The method (200) according to claim 1, further comprising detecting the first and second sensor signals when the lambda difference is below the first threshold.

8. The method (200) according to claim 1, further comprising outputting a warning message occurs if the lambda difference is above the second threshold.

9. The method (200) according to claim 8, wherein outputting the warning message comprises actuating an indicator light.

10. The method (200) according to claim 1, further comprising storing the correction value in a data memory (132) of the computing unit (130).

11. The method (200) according to claim 10, wherein controlling the internal combustion engine comprises adjusting a quantity of fuel supplied to the internal combustion engine.

12. The method (200) according to claim 10, further comprising offsetting the correction value against the first sensor signal in order to obtain a corrected sensor signal.

13. The method (200) according to claim 1, wherein the first exhaust gas sensor is a broadband lambda sensor and the second exhaust gas sensor is a switching-type lambda sensor.

14. A computing unit (130) configured to determine a functionality of an exhaust gas sensor (121) in an exhaust gas system (120) of an internal combustion engine (110) having at least one catalytic converter (122) and a first exhaust gas sensor (121) upstream of the at least one catalytic converter (122) and a second exhaust gas sensor (123) downstream of the at least one catalytic converter (122), by:
controlling heating of the first and the second exhaust gas sensor (121, 123) to a temperature above a minimum operating temperature of the relevant exhaust gas sensor (121, 123),
detecting (210) with the first exhaust sensor a first sensor signal of the first exhaust gas sensor (121), detecting (220) with the second exhaust gas sensor a second sensor signal of the second exhaust gas sensor (123), comparing (230) with the computing unit (130) the first and the second sensor signals in an operating period in which a temperature of the at least one catalytic converter (122) does not exceed a temperature threshold value in the range of 0° C. to 200° C.,
computing with the computing unit (130) a lambda difference between the first and second sensor signals;
determining (250) with the computing unit (130) a correction value of the first exhaust gas sensor (121) when the lambda difference is between a first threshold value and a second threshold value; and
control the internal combustion engine according to the correction value.

15. A non-transitory, computer-readable medium containing instructions that when executed by a computer cause the computer to determine a functionality of an exhaust gas sensor (121) in an exhaust gas system (120) of an internal combustion engine (110) having at least one catalytic converter (122) and a first exhaust gas sensor (121) upstream of the at least one catalytic converter (122) and a second exhaust gas sensor (123) downstream of the at least one catalytic converter (122), by:
controlling heating of the first and the second exhaust gas sensor (121, 123) to a temperature above a minimum operating temperature of the relevant exhaust gas sensor (121, 123),
detecting (210) with the first exhaust sensor a first sensor signal of the first exhaust gas sensor (121), detecting (220) with the second exhaust sensor a second sensor signal of the second exhaust gas sensor (123), comparing (230) with a computing unit (130) the first and the second sensor signals in an operating period in which a temperature of the at least one catalytic converter (122) does not exceed a temperature threshold value, and
computing with the computing unit (130) a lambda difference between the first and second sensor signals;
determining (250) with the computing unit (130) a correction value of the first exhaust gas sensor (121) when the lambda difference is between a first threshold value and a second threshold value; and
controlling the internal combustion engine according to the correction value.

\* \* \* \* \*